United States Patent
Ishizaki et al.

(10) Patent No.: US 9,932,447 B2
(45) Date of Patent: *Apr. 3, 2018

(54) CURABLE RESIN COMPOSITION

(71) Applicant: TOAGOSEI CO., LTD., Tokyo (JP)

(72) Inventors: Kenichi Ishizaki, Nagoya (JP); Yushi Ando, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/915,981

(22) PCT Filed: Aug. 22, 2014

(86) PCT No.: PCT/JP2014/072020
§ 371 (c)(1),
(2) Date: Mar. 2, 2016

(87) PCT Pub. No.: WO2015/033801
PCT Pub. Date: Mar. 12, 2015

(65) Prior Publication Data
US 2016/0208051 A1    Jul. 21, 2016

(30) Foreign Application Priority Data
Sep. 3, 2013    (JP) .................................. 2013-182243

(51) Int. Cl.
*C08G 77/38*    (2006.01)
*C08L 101/10*    (2006.01)
*C08K 5/19*    (2006.01)
*C08K 5/3432*    (2006.01)
*C08K 5/3445*    (2006.01)
*C08K 5/372*    (2006.01)
*C08K 5/42*    (2006.01)
*C08K 5/43*    (2006.01)

(52) U.S. Cl.
CPC ............... *C08G 77/38* (2013.01); *C08K 5/19* (2013.01); *C08K 5/3432* (2013.01); *C08K 5/3445* (2013.01); *C08K 5/372* (2013.01); *C08K 5/42* (2013.01); *C08K 5/43* (2013.01); *C08L 101/10* (2013.01)

(58) Field of Classification Search
CPC ...... C08L 101/10; C08K 5/0025; C08K 5/435
USPC ........................................................ 525/452
See application file for complete search history.

(56) References Cited

U.S. PATENT DOCUMENTS

2008/0250979 A1* 10/2008 Irie .......................... C09D 5/04
  106/287.22
2010/0041810 A1* 2/2010 Wakabayashi ........... C08K 3/16
  524/425
2012/0128551 A1  5/2012 Malik et al.
2012/0146264 A1* 6/2012 Kawashima ............. B41C 1/05
  264/400
2013/0047878 A1* 2/2013 Matsumoto ............. B41C 1/05
  101/395

FOREIGN PATENT DOCUMENTS

| JP | S59-33351 A | 2/1984 |
| JP | 3-14861 A | 1/1991 |
| JP | 4-91182 A | 3/1992 |
| JP | H4-202478 A | 7/1992 |
| JP | H5-117519 A | 5/1993 |
| JP | H5-345879 A | 12/1993 |
| JP | 6-322018 A | 11/1994 |
| JP | 7-11154 A | 1/1995 |
| JP | 7-224132 A | 8/1995 |
| JP | H9-12860 A | 1/1997 |
| JP | 11-1635 A | 1/1999 |
| JP | 11001635 A * | 1/1999 |
| JP | 11-228868 A | 8/1999 |

(Continued)

OTHER PUBLICATIONS

Guthrie. Hydrolysis of esters of oxy acids: pKa values for strong acids; BrfInsted relationship for attack of water at methyl; free energies of hydrolysis of esters of oxy acids; and a linear relationship between free energy of hydrolysis and pKa holding over a range of 20 pK units. Can. J. Chem. 56, 2342 (1978).*
Machine Translation of JP 2011-208073.*
Machine Translation of JP 11001635 A.*
Machine Translation of JP 11228868 A.*
International Search Report for PCT/JP2014/072020 dated Dec. 2, 2014; English Translation submitted herewith (4 Pages).
European Patent Office Communication with Supplementary EPO Search Report, dated Apr. 5, 2017, in EPO Appln. 14 84 2692.7.
State Intellectual Property Office of People's Republic of China, PRC Application 201480052890.9, Office Action dated May 27, 2017 (with translation).

(Continued)

*Primary Examiner* — Mike M Dollinger
(74) *Attorney, Agent, or Firm* — Fitch, Even, Tabin & Flannery, LLP

(57) ABSTRACT

Provided is a curable resin composition which exhibits excellent curability and is good in storage stability. The curable resin composition comprises (a) a polymer having a hydrolyzable silyl group, (b) an acid catalyst, and (c) an onium salt represented by the following general formula (1):

$$C^+ A^- \qquad (1)$$

wherein $C^+$ is an onium cation, and $A^-$ is a hydrogen sulfate anion, a hydrogen sulfite anion, a sulfonate anion represented by $R^1 SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl) imide anion represented by $(R^2 SO_2)_2 N^-$ wherein $R^2$ represents an alkyl group, perfluoroalkyl group, or aryl group; tetrafluoroborate anion, or hexafluorophosphate anion.

8 Claims, No Drawings

(56) References Cited

FOREIGN PATENT DOCUMENTS

| | | | |
|---|---|---|---|
| JP | 11228868 A | * | 8/1999 |
| JP | 2003-206410 | | 7/2003 |
| JP | 2004154664 A | * | 6/2004 |
| JP | 2005-54174 A | | 3/2005 |
| JP | 2006-32248 A | | 2/2006 |
| JP | 2011-208073 A | | 10/2011 |
| WO | 2004/22618 A1 | | 3/2004 |
| WO | 2007/029733 A | | 3/2007 |
| WO | 2008/62866 A1 | | 5/2008 |
| WO | 2008/78654 A1 | | 7/2008 |

OTHER PUBLICATIONS

State Intellectual Property Office of the People's Republic of China, Office Action (with translation) dated Dec. 4, 2017, issued in PRC appln. 201480052890.9.
Office Action issued by ROC (Taiwan) Patent Office, against Taiwan counterpart application.

* cited by examiner

CURABLE RESIN COMPOSITION

CROSS-REFERENCE TO RELATED APPLICATIONS

This application is a U.S. national phase application filed under 35 U.S.C. §371 of International Application No. PCT/JP2014/072020, filed Aug. 22, 2014, designating the United States, which claims priority from Japanese Patent Application No. 2013-182243, filed Sep. 3, 2013, and the complete disclosures of which applications are hereby incorporated herein by reference in their entirety for all purposes.

TECHNICAL FIELD

The present invention relates to a curable resin composition. More specifically, the present invention relates to a curable resin composition containing a polymer having a hydrolyzable silyl group, which is well-balanced between excellent curability and storage stability.

BACKGROUND ART

The curable resin composition containing a polymer having a hydrolyzable silyl group undergoes hydrolysis and condensation reaction due to moisture or the like in the air or on adherends so as to yield rubber-like cured products. The cured products have flexibility even at a relatively low temperature, and thus are widely used for coatings, adhesives, sealants, etc.

In order to accelerate the above reaction, a curing catalyst is usually used. The curing catalyst is required to have a property of being kept stable without gelation or increase in viscosity of the curable resin composition in a sealed condition shielded from humidity. On the other hand, it is required to cause the curable resin composition to rapidly react to cure when coated on an adherend. As conventionally-known curing catalysts, organic tin catalysts such as dibutyltin bis(acetylacetonate) and dibutyltin laurate have been widely used. However, toxicity of these organic tin compounds has been recently noticed, and various other curing catalyst have been investigated. For example, other metal catalysts than organic tin compounds (Patent Documents 1 and 2), acid catalysts (Patent Documents 3 and 4), amine-based catalysts (Patent Document 5), and boron trifluoride-based catalysts (Patent Document 6) have been proposed. Acid catalysts that are blocked with amine (Patent Documents 7 and 8) have also been proposed in order to improve storage stability of curable resin compositions of one-pack type. A combination of an amidine-containing compound with a sulfonyl group-containing compound (Patent Document 9) and a combination of a fluoride and a protonic acid (Patent Document 10) have also been proposed.

CONVENTIONAL TECHNICAL DOCUMENTS

Patent Documents

Patent Document 1: Japanese Patent Publication (Laid-open) No. H9-12860.
Patent Document 2: Japanese Patent Publication (Laid-open) No. 2003-206410.
Patent Document 3: Japanese Patent Publication (Laid-open) No. S59-33351.
Patent Document 4: Japanese Patent Publication (Laid-open) No. H4-202478.
Patent Document 5: International Publication No. WO2004/22618.
Patent Document 6: Japanese Patent Publication (Laid-open) No. 2005-54174.
Patent Document 7: Japanese Patent Publication (Laid-open) No. H5-117519.
Patent Document 8: Japanese Patent Publication (Laid-open) No. H5-345879.
Patent Document 9: International Publication No. WO2008/78654.
Patent Document 10: International Publication No. WO2008/62866.

SUMMARY OF INVENTION

Problems to be Solved by the Invention

However, the curable compositions disclosed in the above Patent Documents 1 and 2 are insufficient in curability. Further, the curing catalysts disclosed in the above Patent Documents 3 and 4 are high in catalytic activity at ordinary temperature, and thus are problematic in that they give curable compositions poor in storage stability. The curable composition disclosed in the Patent Document 5 is insufficient in curability and poor in adhesiveness of cured products. Further, the metal chlorides disclosed in the Patent Document 6 produce hydrochloric acid or hydrofluoric acid due to hydrolysis, and thus cause corrosion. The curing catalysts disclosed in the Patent Documents 7 and 8 are problematic in that they do not work without heating. The curing catalyst disclosed in the Patent Document 9 requires a compound containing a substantially great amount of sulfonyl groups which is likely to bleed out of cured products. The Patent Document 10 describes imidazolium bifluoride as a kind of fluorides and describes phosphoric acid and sulfonic acid as kinds of protonic acids, but storage stability of the resultant curable composition is unknown.

The present invention has been made in light of the above described circumstances, and the objective thereof is to provide a curable resin composition containing a polymer having a hydrolyzable silyl group, which exhibits excellent curability and is good in storage stability.

Means for Solving the Problems

The present inventors have made diligent studies for solving the aforementioned problems, and as a result, have found that a curable resin composition containing a polymer having a hydrolyzable silyl group, an acid catalyst, and a specific onium salt possesses excellent curability and storage sbatility in combination. Thus, the present invention has been accomplished.

That is, the present invention is as follows.

1. A curable resin composition which comprises (a) a polymer having a hydrolyzable silyl group, (b) an acid catalyst, and (c) an onium salt represented by the following general formula (1):

$$C^+A^- \tag{1}$$

wherein $C^+$ is an onium cation, and $A^-$ is a hydrogen sulfate anion, a hydrogen sulfite anion, a sulfonate anion represented by $R^1SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl)imide anion represented by $(R^2SO_2)_2N^-$ wherein $R^2$ represents an alkyl group, perfluoroalkyl group, or aryl group; tetrafluoroborate anion, or hexafluorophosphate anion.

2. The curable resin composition according to the above item 1, wherein the main chain chemical structure of the polymer (a) having a hydrolyzable silyl group is at least one polymer selected from the group consisting of oxyalkylene polymer, vinyl polymer, polyester polymer, polyurethane polymer, and polycarbonate polymer.

3. The curable resin composition according to the above item 1 or 2, wherein the polymer (a) having a hydrolyzable silyl group has a number average molecular weight of from 500 to 50,000.

4. The curable resin composition according to any one of the above items 1 to 3, wherein the acid catalyst (b) is an acid having a pKa of 4 or lower at 25° C.

5. The curable resin composition according to any one of the above items 1 to 4, wherein the acid catalyst (b) is at least one acid selected from the group consisting of sulfonic acid, hydrochloric acid, nitric acid, phosphoric acid, phosphoric acid monoester, phosphoric acid diester, phosphorous acid, phosphorous acid ester, hypophosphorous acid, halogenated alkylcarboxylic acid, and halogenated arylcarboxylic acid.

6. The curable resin composition according to any one of the above items 1 to 5, which contains the acid catalyst (b) in an amount of from 0.002 to 2 parts by mass, relative to 100 parts by mass of the polymer (a) having a hydrolyzable silyl group.

7. The curable resin composition according to any one of the above items 1 to 6, wherein the cation of the onium salt (c) is at least one onium cation selected from the group consisting of quaternary ammonium cation, imidazolium cation, pyridinium cation, and tertiary sulfonium cation.

8. The curable resin composition according to any one of the above items 1 to 7, wherein the anion of the onium salt (c) is at least one anion selected from the group consisting of hydrogen sulfate anion, perfluoroalkylsulfonate anion, and bis(perfluoroalkane sulfonyl)imide anion.

9. The curable resin composition according to any one of the above items 1 to 8, which contains the onium salt (c) in an amount of from 0.005 to 10 parts by mass, relative to 100 parts by mass of the polymer (a) having a hydrolyzable silyl group.

Effect of the Invention

The curable resin composition according to the present invention contains a polymer having a hydrolyzable silyl group, an acid catalyst and an onium salt represented by the general formula (1), and thus exhibits excellent curability and is good in storage stability.

DESCRIPTION OF EMBODIMENTS

Hereinafter, details of the curable resin composition according to the present invention will be described.

The curable resin composition according to the present invention comprises (a) a polymer having a hydrolyzable silyl group, (b) an acid catalyst, and (c) an onium salt represented by the general formula (1).

The above "(a) a polymer having a hydrolyzable silyl group" is a major ingredient of the curable resin composition, and determines the properties of cured products. The main chain chemical structure of this polymer is preferably at least one type of polymer selected from the group consisting of oxyalkylene-based polymer, vinyl-based polymer, polyester-based polymer, polyurethane-based polymer, and polycarbonate-based polymer. Among them, more preferred from the viewpoint of flexibility and durability of cured products are oxyalkylene-based polymer and vinyl-based polymer. The above polymer may be either a straight chain polymer or a branched polymer. It may also be a combination thereof.

The above oxyalkylene-based polymer is not particularly limited so long as it contains a repetition unit expressed by the general formula (2) below.

$$—O—R^{10}— \quad (2)$$

In the above formula, $R^{10}$ represents a divalent hydrocarbon group.

As $R^{10}$ in the above general formula (2), there can be mentioned —$CH(CH_3)$—$CH_2$—, —$CH(C_2H_5)$—$CH_2$—, —$C(CH_3)_2$—$CH_2$—, —$CH_2CH_2CH_2CH_2$—, and the like. Preferred among them is —$CH(CH_3)$—$CH_2$—. The above oxyalkylene-based polymer may contain one type of the above repetition unit alone, or may contain two or more types in combination thereof.

The method of producing the above oxyalkylene-based polymer is not particularly limited, however, there can be mentioned a production method using an alkali catalyst such as KOH, a production method using a transition metal compound-porphyrin complex catalyst, a production method using complex-metal cyanide complex catalyst, a production method using phosphazene, and the like. Among these, the production method using complex-metal cyanide complex catalyst is suitable for obtaining polymers with high molecular weight and having a narrow molecular weight distribution. Furthermore, the use of this polymer is preferred to obtain a curable resin composition with excellent balance in viscosity and fracture elongation of the hardened product.

The above mentioned vinyl based polymers are not particularly limited so long as they result from polymerization of a vinyl monomer capable of causing radical polymerization. The vinyl-based monomers include (meth)acrylic acid based monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxypropyl (meth)acrylate, 2-hydroxyethyl (meth)acrylate, 2-hydroxypropyl (meth)acrylate, stearyl (meth)acrylate, ethylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadcylethyl (meth)acrylate; styrene-based monomers such as styrene, vinyltoluene, α-methylstyrene, chlorostyrene, styrenesulfonic acid and its salts, or the like; fluorine-containing vinyl monomers such as perfluoroethylene, perfluoropropylene, and vinylidene fluoride; maleic anhydride, maleic acid, and monoalkyl esters and dialkyl esters of maleic acid; fumaric acid and monoalkyl esters and dialkyl esters of fumaric acid; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; a nitrile-group containing vinyl-based monomer such as acrylonitrile and methacrylonitrile; an amido-group containing vinyl-based monomer such as acrylamide and methacrylamide; a vinyl ester such as vinyl acetate, vinyl propionate, vinyl pivalate, vinyl benzoate and vinyl cinnamate; an alkene such as ethylene and propylene; a conjugate diene such as butadiene and isoprene; vinyl chloride, vinylidene chloride, allyl chloride and allyl alcohol. These can be used alone or in a combination of two or more thereof. In the above notation, for example, (meth) acrylic acid represents acrylic acid or methacrylic acid.

The vinyl-based polymer having a hydrolyzable silyl group can be produced by a method known in the art disclosed in, for instance, Japanese Patent Publication (Laid-open) No. S59-122541, Japanese Patent Publication (Laid-open) No. S60-31556, Japanese Patent Publication (Laid-open) No. S63-112642, and Japanese Patent Publication (Laid-open) No. H6-172631.

Further, as a polymer having a hydrolyzable silyl group, there can be used a graft copolymer having an alkoxysilyl group. Such a copolymer is disclosed in, for example, International Publication WO2007/023669.

Furthermore, the polymer having a hydrolyzable silyl group according to the present invention may contain a polar element portion in the molecule. The polar element portion herein refers to a urethane bond, thiourethane bond, urea bond, thiourea bond, substituted urea bond, substituted thiourea bond, amide bond, sulfide bond and the like. This type of setting resin containing a polar element portion within the molecule is disclosed in, for example, Japanese Patent Publication (Laid-open) No. 2000-169544 and the like.

The hydrolyzable silyl group contained in the above polymer (a) having a hydrolyzable silyl group has a silicon atom and a hydroxyl group and/or a hydrolyzable functional group bonded to the silicon atom, which, upon hydrolysis, forms a siloxane bonding and a crosslinked structure. There is no particular limitation for the hydrolyzable silyl group, but preferred are the groups represented by the general formula (3) below:

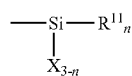

(3)

wherein $R^{11}$ each independently represents a hydrocarbon group; X each independently represents a reactive group selected from halogen atom, hydrogen atom, hydroxyl group, an alkoxy group, an acyloxy group, a ketoximate group, an amide group, an acid amide group, a mercapto group, an alkenyloxy group, and an aminoxy group; and n is 0, 1, or 2.

In the above general formula (3), $R^{11}$ preferably is an alkyl group having from 1 to 20 carbon atoms, an aryl group having from 6 to 20 carbon atoms, or an aralkyl group having from 7 to 20 carbon atoms. When n is 2, plural $R^{11}$ groups may be the same or different. When n is 0 or 1, plural X groups may be the same or different. In the above general formula (3), X is preferably an alkoxy group.

Because the polymer of the above component (a) has a hydrolyzable silyl group, Si—O—Si bonds are established by hydrolytic condensation to form a cured body, such as a film, which exhibits excellent strength. In the above general formula (3), when X is an alkoxy group, the hydrolyzable silyl group is an alkoxysilyl group, such as trimethoxysilyl group, methyldimethoxysilyl group, dimethylmethoxysilyl group, triethoxysilyl group, methyldiethoxysilyl group, and methylbis(2-methoxyethoxy)silyl group. From the viewpoint of balanced setting rate and flexibility, particularly preferred among them are trimethoxysilyl group and methyldimethoxysilyl group.

The average number of the hydrolyzable silyl group per molecule of the above component (a) is preferably 1 to 4, more preferably 1.5 to 3, from the viewpoint of adhesiveness and flexibility of the cured body. If the number of the hydrolyzable silyl group is less than 1, the setting of the curable resin composition may become insufficient, and if it exceeds 4, the hardened product may become too stiff.

Furthermore, the position of the hydrolyzable silyl group contained in the above component (a) is not particularly limited, and may be located in side chains and/or at terminals of the polymer.

The number average molecular weight of the above polymer (a) having a hydrolyzable silyl group is preferably in a range of from 500 to 50000, more preferably from 1000 to 40000, and further preferably from 3000 to 35000. So long as the number average molecular weight is in the range of from 500 to 50000, a curable resin composition giving hardened products that exhibit favorable flexibility and excellent durability can be obtained.

The average molecular weight in the present invention was measured by gel permeation chromatography (hereinafter, simply referred to as "GPC"). The GPC measurement was carried out by using a polystyrene gel column with tetrahydrofuran as the mobile phase. The molecular weight was obtained as a polystyrene-converted value.

The aforementioned "(b) acid catalyst" is a curing catalyst for the above polymer (a) having a hydrolyzable silyl group. Preferred as the acid catalyst is an acid having pKa value at 25° C. of 4 or lower. More preferably, the pKa value is 3.0 or lower. An acid having a pKa value of 4 or lower enables the curable resin composition to cure of at a rate suitable for practical use. Specific examples of the acid catalysts include sulfonic acid, hydrochloric acid, nitric acid, phosphoric acid, phosphoric acid monoester, phosphoric acid diester, phosphorous acid, phosphorous acid ester, hypophosphorous acid, and the like. Further, may be used halogenated alkylcarboxylic acids such as trifluoroacetic acid, chloroacetic acid, dichloroacetic acid and trichloroacetic acid, and halogenated arylcarboxylic acid such as pentafluorobenzoic acid and 2,4,6-trifluoromethylbenzoic acid. Among them, preferred from hardening properties are sulfonic acid, phosphoric acid, phosphoric acid monoester, and phosphoric acid diester.

The content of the acid catalyst in the curable resin composition is from 0.002 to 2 parts by mass per 100 parts by mass of the polymer having a hydrolyzable silyl group. Preferably, the content of the acid catalyst is from 0.0025 to 1.5 parts by mass, and more preferably from 0.003 to 1 part by mass. So long as the content of the acid catalyst is in the range of from 0.002 to 2 parts by mass, favorable hardening properties can be achieved, without adversely affecting the storage stability of the curable resin composition.

The curable resin composition according to the present invention contains "(c) an onium salt represented by the following general formula (1)". The use of the onium salt in combination with the above acid catalyst enables the curable resin composition containing the polymer having a hydrolizable silyl group to be well-balanced between curability and storage stability. The reason is considered to be because when the acid is simply mixed with the onium salt, a complex is formed between them through hydrogen bond via proton so as to lower the acid strength and inhibit the acid from acting as a curing catalyst, but when applied to a substrate, the acid is released by the interaction with ion or moisture on the surface of the substrate so as to effectively act as the curing catalyst.

wherein, $C^+$ represents an onium cation and $A^-$ represents hydrogen sulfate anion, hydrogen bisulfite anion, a sulfonate anion represented by $R^1SO_3^-$ (where $R^1$ is an alkyl group, perfluoroalkyl, cycloalkyl group, vinyl group, aryl group, perfluoroaryl group, aralkyl group, or halogen atom), a bis(substituted sulfonyl)imide anion represented by $(R^2SO_2)_2N^-$ (where $R^2$ is an alkyl group, perfluoroalkyl group, or aryl group), tetrafluoroboron anion, or a hexafluorophosphate anion.

The cations of the onium salt above include an onium cation represented by the following general formula (4), an imidazolium cation, a pyridinium cation, and an onium cation represented by the following general formula (5):

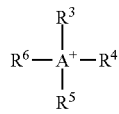

wherein $R^3$ to $R^6$ each independently represents a non-substituted or substituted alkyl group having from 1 to 20 carbon atoms, cycloalkyl group, aryl group, aralkyl group, alkenyl group or alkynyl group; otherwise, part or all of $R^3$ to $R^6$ may form a non-substituted or substituted 3 to 10 membered ring together with the atom represented by A wherein the ring may contain a hetero atom such as O and S, provided that $R^3$ to $R^6$ which do not involve the formation of the ring are the same as defined hereinbefore; and A represents a nitrogen atom or phosphorus atom. Specific examples of the above substituted alkyl group include, for example, an alkoxy group and an alkanoyl group. When part of $R^3$ to $R^6$ form a ring, the ring is, in general, constituted by 2 to 3 of $R^3$ to $R^6$. Specific examples of the compound represented by the formula (4) in which two of $R^3$ to $R^6$ form a ring include piperidinium cation, morpholinium cation, and pyrrolidinium cation.

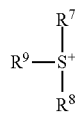

wherein $R^7$ to $R^9$ each independently represents a non-substituted or substituted alkyl group having from 1 to 20 carbon atoms, cycloalkyl group, aryl group, aralkyl group, alkenyl group or alkynyl group; otherwise, part or all of $R^7$ to $R^9$ may form a non-substituted or substituted 3 to 10 membered ring together with the sulfur atom wherein the ring may contain a hetero atom such as O and S, provided that $R^7$ to $R^9$ which do not involve the formation of the ring are the same as defined hereinbefore. Specific examples of the above substituted alkyl group include, for example, an alkoxy group and an alkanoyl group.

Representative examples of the onium cations represented by the general formula (4) include a quaternary ammonium cation, a quaternary phosphonium cation, and the like.

Specific examples of the quaternary ammonium cations include tetraalkylammonium cations such as tetramethylammonium, ethyltrimethylammonium, diethyldimethylammonium, triethylmethylammonium, tetraethylammonium, tetra-n-butylammonium, trimethyl-n-propylammonium, isopropyl-trimethylammonium, n-butyltrimethylammonium, isobutyltrimethylammonium, t-butyltrimethylammonium, n-hexyltrimethylammonium, dimethyldi-n-propylammonium, dimethyldi-isopropylammonium, isopropyldimethyl-n-propylammonium, methyltri-n-propylammonium, tri-isopropylmethylammonium, isopropylmethyldi-n-propylammonium, methyl-n-propyldiisopropylammonium, triethyl-n-propylammonium, triethylisopropylammonium, n-butyltriethylammonium, triethylisobutylammonium, t-butyltriethylammonium, di-n-butyldimethylammonium, diisobutyldimethylammonium, di-t-butyldimethylammonium, n-butylethyldimethylammonium, isobutylethyldimethylammonium, t-butylethyldimethylammonium, n-butylisobutyldimethylammonium, n-butyl-t-butyldimethylammonium, t-butylisobutyldimethylammonium, diethyldi-n-propylammonium, diethyldiisopropylammonium, diethylisopropyl-n-propylammonium, ethyltri-n-propylammonium, ethyltriisopropylammonium, ethylisopropyldi-n-propylammonium, ethyldiisopropyl-n-propylammonium, diethylmethyl-n-propylammonium, ethyldimethyl-n-propylammonium, ethylmethyldi-n-propylammonium, diethylisopropylmethylammonium, ethylisopropyldimethylammonium, ethyldiisopropylmethylammonium, ethylmethyl-n-propylisopropylammonium, tetra-n-propylammonium, tetra-isopropylammonium, tri-isopropyl-n-propylammonium, diisopropyldi-n-propylammonium, isopropyl-tri-n-propylammonium, butyltrimethylammonium, trimethylpentylammonium, hexyltrimethylammonium, heptyltrimethylammonium, trimethyloctylammonium, trimethylnonylammonium, decyltrimethylammonium, trimethylundecylammonium, dodecyltrimethylammonium, didecyldimethylammonium, dilauryldimethylammonium, dimethyldistyrylammonium, dimethyldioctadecylammonium, dimethyldioctylammonium, dimethyldipalmitylammonium, ethylhexadecyldimethylammonium, hexyldimethyloctylammonium, dodecyl(ferrocenylmethyl)dimethylammonium and N-methylhomatropinium; an aromatic alkyl group substituted ammonium cation such as benzyltrimethylammonium, benzyltributylammonium and benzyldodecyldimethylammonium; an aromatic substituted ammonium cation such as trimethylphenylammonium and tetraphenylammonium; and aliphatic cyclic ammonium cations such as pyrrolidinium (such as 1,1-dimethylpyrrolidinium, 1-ethyl-1-methylpyrrolidinium, 1,1-diethylpyrrolidinium, 1,1-tetramethylenepyrrolidinium, and 1-butyl-1-methylpyrrolidinium), piperidinium (such as 1,1-dimethylpiperidinium, 1-ethyl-1-methylpiperidinium, 1,1-diethylpiperidinium, and 1-butyl-1-methylpiperidinium), and morpholinium (such as 1,1-dimethylmorpholinium, 1-ethyl-1-methylmorpholinium, and 1,1-diethylmorpholinium).

Specific examples of the quaternary phosphonium cations include cations such as tetramethylphosphonium, triethylmethylphosphonium, and tetraethylphosphonium.

Specific examples of the imidazolium cations include cations such as 1,3-dimethylimidazolium, 1,2,3-trimethylimidazolium, 1-ethyl-3-methylimidazolium, 1-ethyl-2,3-dimethylimidazolium, 1-methyl-3-n-octylimidazolium, 1-hexyl-3-methylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-n-butyl-2,3-methylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 2-n-heptyl-1,3-dimethylimidazolium, 1,3,4-trimethylimidazolium, 2-ethyl-1,3,4-trimethylimidazolium, 1,3-dimethylbenzimidazolium, 3-methyl-1-phenylimidazolium, 1-benzyl-3-methylimidazolium, 2,3-dimethyl-1-phenylimidazolium, 1-benzyl-2,3-dimethylimidazolium, 1,3-dimethyl-2-phenylimidazolium, 2-benzyl-1,3-dimethylimidazolium, 1,3-dimethyl-2-n-undecylimidazolium, and 1,3-dimethyl-2-n-heptadecylimidazolium.

The pyridinium cations include cations such as 1-methylpyridinium, 1-ethylpyridinium, 1-n-propylpyridinium, 1-isopropylpyridinium, 1-n-butylpyridinium, and 1-n-butyl-3-methylpyridinium.

Specific examples of the tertiary sulfonium cations represented by the general formula (5) above include cations such as trimethylsulfonium, triethylsulfonium, tripropylsulfonium, and triphenylsulfonium.

Among the aforementioned onium cations, preferred are quaternary ammonium cations, imidazolium cations, pyridinium cations, or tertiary sulfonium cations from the viewpoint of good balance between high curing acceleration property and storage stability of the curable resin composition; and further preferred are quaternary ammonium cations, imidazolium cations, or pyridinium cations.

The anion of the aforementioned onium salt is hydrogen sulfate anion, hydrogen bisulfite anion, a sulfonate anion represented by $R^1SO_3^-$ (where $R^1$ is an alkyl group, perfluoroalkyl group, cycloalkyl group, vinyl group, aryl group, perfluoroaryl group, aralkyl group, or halogen atom), a bis(substituted sulfonyl)imide anion represented by $R^2SO_2)_2N^-$ (where $R^2$ is an alkyl group, perfluoroalkyl group, or aryl group), tetrafluoroboron anion, or hexafluorophosphate anion. Preferably, the alkyl group represented by $R^1$ or $R^2$ contains from 1 to 15 carbon atoms.

Specific examples of the aforementioned sulfonate anions represented by $R^1SO_3^-$ include anions such as methanesulfonate, ethanesulfonate, propanesulfonate, hexanesulfonate, heptanesulfonate, octanesulfonate, dodecanesulfonate, vinylsulfonate, benzenesulfonate, p-toluenesulfonate, dodecylbenzenesulfonate, 10-camphorsulfonate, pentafluorobenzenesulfonate, fluorosulfonate, chlorosulfonate, and bromosulfonate. The perfluoroalkylsulfonate anions include anions such as trifluoromethanesulfonate anion, and perfluorooctanesulfonate anion. The perfluoroalkyl group should have from 1 to 10 carbon atoms, preferably from 1 to 8 carbon atoms, from the viewpoint of solubility of the corresponding onium salt in the polymer having a hydroxyzable silyl group.

Specific examples of the aforementioned bis(substituted sulfonyl)imide anion represented by $(R^2SO_2)_2N^-$ include bis(methanesulfonyl)imide anion, bis(ethanesulfonyl)imide anion, bis(propanesulfonyl)imide anion, bis(trifluoromethanesulfonyl)imide anion, bis(pentafluoroethanesulfonyl)imide anion, bis(heptafluoropropanesulfonyl)imide anion, and bis(nonafluorobutanesulfonyl)imide anion.

Among these anions, preferred are hydrogen sulfate anions, perfluoroalkylsulfonate anions, and bis(perfluoroalkane sulfonyl)imide anions, and particularly preferred are perfluoroalkylsulfonate anions and bis(perfluoroalkane sulfonyl)imide anions, from the viewpoint of exhibiting excellent curability and of imparting good storage stability to the curable resin composition.

The onium salt used in the present invention is not particularly limited so long as it is a combination of the cations and anions described hereinbefore. Specific examples of the onium salts include tetraethylammonium hydrogensulfate, tetra-n-butylammonium hydrogensulfate, methyltri-n-octyl ammonium hydrogensulfate, amyltriethylammonium hydrogensulfate, cyclohexyltrimethylammonium hydrogensulfate, 1-ethyl-3-methylimidazolium hydrogensulfate, 1-ethyl-2,3-dimethylimidazolium hydrogensulfate, 1-butyl-3-methylimidazolium hydrogensulfate, 1-butyl-2,3-dimethylimidazolium hydrogensulfate, 1-methyl-3-n-octylimidazolium hydrogensulfate, 1-hexyl-3-methylimidazolium hydrogensulfate, 2-ethyl-1,3-dimethylimidazolium hydrogensulfate, 1,3-dimethyl-2-n-propylimidazolium hydrogensulfate, 1,3-dimethyl-2-n-pentylimidazolium hydrogensulfate, 1,3-dimethyl-2-n-heptylimidazolium hydrogensulfate, 1-ethyl-1-methylpiperidinium hydrogensulfate, 1-butyl-1-methylpiperidinium hydrogensulfate, 1-ethyl-1-methylpyrrolidinium hydrogensulfate, 1-butyl-1-methylpyrrolidinium hydrogensulfate, 1-methyl-1-propylpyrrolidinium hydrogensulfate, 1-ethylpyridinium hydrogensulfate, 1-ethyl-3-methylpyridinium hydrogensulfate, 1-butyl-3-methylpyridinium hydrogensulfate, 1-ethyl-4-methylpyridinium hydrogensulfate, 1-butylpyridinium hydrogensulfate, 1-butyl-4-methylpyridinium hydrogensulfate, tetramethylphosphonium hydrogensulfate, triethylmethylphosphonium hydrogensulfate, tetraethylphosphonium hydrogensulfate, tetra-n-butylammonium methanesulfonate, methyltri-n-octylammonium methanesulfonate, 1-ethyl-3-methylimidazolium methanesulfonate, 1-ethyl-2,3-dimethylimidazolium methanesulfonate, 1-butyl-3-methylimidazolium methanesulfonate, 1-butyl-2,3-dimethylimidazolium methanesulfonate, 1-ethyl-1-methylpiperidinium methanesulfonate, 1-butyl-1-methylpiperidinium methanesulfonate, 1-ethyl-1-methylpyrrolidinium methanesulfonate, 1-butyl-1-methylpyrrolidinium methanesulfonate, 1-methyl-1-propylpyrrolidinium methanesulfonate, 1-ethylpyridinium methanesulfonate, 1-ethyl-3-methylpyridinium methanesulfonate, 1-butyl-3-methylpyridinium methanesulfonate, tetraethylphosphonium methanesulfonate, tetra-n-butylammonium p-toluenesulfonate, methyltri-n-octylammonium p-toluenesulfonate, 1-ethyl-3-methylimidazolium p-toluenesulfonate, 1-ethyl-2,3-dimethylimidazolium p-toluenesulfonate, 1-butyl-3-methylimidazolium p-toluenesulfonate, 1-butyl-2,3-dimethylimidazolium p-toluenesulfonate, 1-ethyl-1-methylpiperidinium p-toluenesulfonate, 1-butyl-1-methylpiperidinium p-toluenesulfonate, 1-ethyl-1-methylpyrrolidinium p-toluenesulfonate, 1-butyl-1-methylpyrrolidinium p-toluenesulfonate, 1-methyl-1-propylpyrrolidinium p-toluenesulfonate, 1-ethylpyridinium p-toluenesulfonate, 1-ethyl-3-methylpyridinium p-toluenesulfonate, 1-butyl-3-methylpyridinium p-toluenesulfonate, tetraethylphosphonium p-toluenesulfonate, tetraethylammonium trifluoromethanesulfonate, tetra-n-butylammonium trifluoromethanesulfonate, methyltri-n-butylammonium trifluoromethanesulfonate, methyltri-n-octylammonium trifluoromethanesulfonate, amyltriethylammonium trifluoromethanesulfonate, cyclohexyltrimethylammonium trifluoromethanesulfonate, benzyltributylammonium trifluoromethanesulfonate, benzyldodecyldimethylammonium trifluoromethanesulfonate, didecyldimethylammonium trifluoromethanesulfonate, dilauryldimethylammonium trifluoromethanesulfonate, hexyldimethyloctylammonium trifluoromethanesulfonate, dodecyl(ferrocenylmethyl)dimethylammonium trifluoromethanesulfonate, 1-ethyl-3-methylimidazolium trifluoromethanesulfonate, 1-ethyl-2,3-dimethylimidazolium trifluoromethanesulfonate, 1-butyl-3-methylimidazolium trifluoromethanesulfonate, 1-butyl-2,3-dimethylimidazolium trifluoromethanesulfonate, 1-methyl-3-n-octylimidazolium trifluoromethanesulfonate, 1-hexyl-3-methylimidazolium trifluoromethanesulfonate, 2-ethyl-1,3-dimethylimidazolium trifluoromethanesulfonate, 1,3-dimethyl-2-n-propylimidazolium trifluoromethanesulfonate, 1,3-dimethyl-2-n-pentylimidazolium trifluoromethanesulfonate, 1,3-dimethyl-2-n-heptylimidazolium trifluoromethanesulfonate, 1-ethyl-1-methylpiperidinium trifluoromethanesulfonate, 1-butyl-1-methylpiperidinium trifluoromethanesulfonate, 1-ethyl-1-methylpyrrolidinium trifluoromethanesulfonate, 1-butyl-1-methylpyrrolidinium trifluoromethanesulfonate, 1-methyl-1-propylpyrrolidinium trifluoromethanesulfonate, 1-ethylpyridinium trifluoromethanesulfonate, 1-ethyl-3-methylpyridinium trifluoromethanesulfonate, 1-butyl-3-methylpyridinium trifluoromethanesulfonate, 1-ethyl-4-methylpyridinium trifluoromethanesulfonate, 1-butylpyridinium trifluoromethanesulfonate, 1-butyl-4-methylpyridinium trifluoromethanesulfonate, tetramethylphosphonium trifluoromethanesulfonate, triethylmethylphosphonium trifluoromethanesulfonate, tetraethylphosphonium trifluoromethanesulfonate, tetraethylammonium bis(trifluoromethanesulfonyl)imide, tetra-n-butylammonium bis(trifluoromethanesulfonyl)imide, methyltri-n-octylammonium bis(trifluoromethanesulfonyl)imide, 1-ethyl-3-methylimidazolium bis(trifluoromethanesulfonyl)imide, 1-ethyl-2,3-dimethylimidazolium bis(trifluoromethanesulfonyl)imide, 1-butyl-3-methylimidazolium bis(trifluoromethanesulfonyl)imide, 1-butyl-2,3-dimethylimidazolium bis(trifluoromethanesulfonyl)imide, 1-ethyl-1-methylpiperidinium bis(trifluoromethanesulfonyl)imide, 1-butyl-1-methylpiperidinium bis(trifluoromethanesulfonyl)imide, 1-ethyl-1-methylpyrrolidinium bis(trifluoromethanesulfonyl)imide, 1-butyl-1-methylpyrrolidinium bis(trifluoromethanesulfonyl)imide, 1-methyl-1-propylpyrrolidinium bis(trifluoromethanesulfonyl)imide, 1-ethylpyridinium bis(trifluoromethanesulfonyl)imide, 1-ethyl-3-methylpyridinium bis(trifluoromethanesulfonyl)imide, 1-butyl-3-methylpyridinium bis(trifluoromethanesulfonyl)imide, triethylsulfonium bis(trifluoromethanesulfonyl)imide, tetrabutylammonium tetrafluoroborate, 1-ethyl-3-methylimidazolium tetrafluoroborate, tetrabutylammonium hexafluorophosphate and 1-butyl-3-methylimidazolium hexafluorophosphate.

The onium salt according to the present invention can be obtained by methods known in the art. For instance, they can be prepared from the corresponding onium halides as described in, Hiroyuki Ohno et al., J. Am. Chem. Soc., 2005, 27, 2398-2399; or in Peter Wasserscheid et al., Green Chemistry, 2002, 4, 134-138.

The content of the aforementioned onium salt (c) in the curable resin composition is, preferably from 0.005 to 10 parts by mass, more preferably from 0.01 to 9 parts by mass, and further preferably from 0.02 to 8 parts by mass, per 100 parts by mass of the polymer (a) having a hydrolyzable silyl group. So long as the content of the onium salt is in the range of from 0.005 to 10 parts by mass, a curable resin composition excellent in curability and storage stability is obtained.

In addition to the aforementioned components (a) to (c), the curable resin composition according to the present invention may further contain, for example, additives such as fillers, plasticizers, antioxidants, ultraviolet absorbers, flame retardants, antifoaming agents, lubricants, weathering stabilizers, light stabilizers, heat stabilizers, colorants (pigments, dyes, etc.), fluorescent brightening agents, adhesion promoters, anti-sagging agents, conductivity imparting agents, antistatic agents, water repellent agents, oil repellent agents, preservatives and dehydrating agents, or organic solvents.

In the curable composition according to the present invention, the acid catalyst (b) and the oniium salt (c) having a specific structure are used as curing catalysts, and another curing catalyst may be optionally added thereto to the extent that the effect of the present invention is not impaired. Curing catalysts other than the acid catalyst (b) and the oniium salt (c) having a specific structure are not specifically limited, but include, for example, metal carboxylate salts such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, and cerium carboxylate; titanium compounds such as tetrabutyl titanate, tetrapropyl titanate, titanium tetrakis(acetylacetonate), diisopropoxytitanium bis(acetylacetonate), and diisopropoxytitanium bis(ethylacetoacetate); organotin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate); aluminum compounds such as aluminum tris(acetylacetonate), aluminum tris(ethylacetoacetate), and diisopropoxyaluminum ethylacetoacetate; zirconium compounds such as zirconium tetrakis(acetylacetonate); and various metal alkoxides such as tetrabutoxyhafnium.

By the combined use of the above curing catalyst other than the acid catalyst (b) and the oniium salt (c) having a specific structure, it is expected that catalyst activity is enhanced, and curability of deep portions, curability of thin layers, adhesiveness or the like is improved. However, when an organic tin compound is used in combination, toxicity of the curable composition tends to increase with increase of the blending amount of the organic tin, and thus it is preferable that the addition amount of the organic tin compound is kept as low as possible. The content of the other curing catalysts is preferably 0.01 to 10 parts by mass, more preferably 0.1 to 5 parts by mass, per 100 parts by mass of the polymer (a) having a hydrolyzable silyl group.

The filler includes, for example, precipitated calcium carbonate, colloidal calcium carbonate, heavy calcium carbonate, magnesium carbonate, zinc carbonate, aluminium hydroxide, magnesium hydroxide, carbon black, clay, talc, fumed silica, pyrogenic silica, precipitated silica, pulverized silica, fused silica, kaolin, diatomite, zeolite, titanium oxide, calcium oxide, iron oxide, zinc oxide, barium oxide, aluminum oxide, magnesium oxide, aluminum sulfate, glass fiber, carbon fiber, glass balloon, Shirasu balloon, Saran balloon, and phenol balloon. These may be used alone or in combination of two or more. Among the above fillers, calcium carbonate is preferred, and the use of heavy calcium carbonate in combination with precipitated calcium carbonate is particularly preferred.

When the curable resin composition according to the present invention contains fillers, the content thereof is preferably 20 to 300 parts by mass, more preferably 50 to 200 parts by mass, per 100 parts by mass of the polymer (a) having a hydrolyzable silyl group. When the filler is a combination of precipitated calcium carbonate with heavy calcium carbonate, the ratio of precipitated calcium carbonate/heavy calcium carbonate is preferably 90/10 to 50/50 (mass ratio). When the content of the filler is within the above range, mechanical properties are excellent.

The plasticizer includes, for example, phthalic acid ester, trimellitic acid ester, pyromellitic acid ester, aliphatic monobasic acid ester, aliphatic dibasic acid ester, phosphoric acid ester, polyhydric alcohol ester, epoxy-based plasticizer, polymer-type plasticizer, and chlorinated paraffin. These may be used alone or in combination of two or more.

The phthalic acid ester includes, for example, dimethyl phthalate, diethyl phthalate, dipropyl phthalate, diisopropyl phthalate, dibutyl phthalate, diisobutyl phthalate, diamyl phthalate, di-n-hexyl phthalate, dicyclohexyl phthalate, diheptyl phthalate, d-n-octyl phthalate, dinonyl phthalate, diisononyl phthalate, diisodecyl phthalate, diundecyl phthalate, ditridecyl phthalate, diphenyl phthalate, di(2-ethylhexyl) phthalate, di(2-butoxyethyl) phthalate, benzyl 2-ethylhexyl phthalate, benzyl n-butyl phthalate, benzyl isononyl phthalate, and dimethyl isophthalate.

The trimellitic acid ester includes, for example, tributyl trimellitate, trihexyl trimellitate, tri-n-octyl trimellitate, tri(2-ethylhexyl) trimellitate, and triisodecyl trimellitate.

The pyromellitic acid ester includes, for example, tetrabutyl pyromellitate, tetrahexyl pyromellitate, tetra-n-octyl pyromellitate, tetra(2-ethylhexyl) pyromellitate, and tetradecyl pyromellitate.

The aliphatic monobasic acid ester includes, for example, butyl oleate, methyl oleate, methyl octanoate, butyl octanoate, methyl dodecanoate, butyl dodecanoate, methyl palmitate, butyl palmitate, methyl stearate, butyl stearate, methyl linoleate, butyl linoleate, methyl isostearate, butyl isostearate, methylacetyl ricinolate, and butylacetyl ricinolate.

The aliphatic dibasic acid ester includes, for example, dimethyl adipate, diethyl adipate, di-n-propyl adipate, diisopropyl adipate, diisobutyl adipate, di-n-octyl adipate, bis(2-ethylhexyl) adipate, diisononyl adipate, diisodecyl adipate, bis(2-butoxyethyl) adipate, di(butylglycol) adipate, heptylnonyl adipate, dimethyl azelate, di-n-octyl azelate, bis(2-ethylhexyl) azelate, diethyl succinate, dimethyl sebacate, diethyl sebacate, dibutyl sebacate, di-n-octyl sebacate, bis(2-ethylhexyl) sebacate, dibutyl fumarate, bis(2-ethylhexyl) fumarate, dimethyl maleate, diethyl maleate, di-n-butyl maleate, and bis(2-ethylhexyl) maleate.

The phosphoric acid ester includes, for example, trimethyl phosphate, triethyl phosphate, tributyl phosphate, tri-n-amyl phosphate, triphenyl phosphate, tri-o-cresyl phosphate, trixylenyl phosphate, 2-ethylhexyl diphenyl phosphate, diphenyl cresyl phosphate, tris(2-butoxyethyl) phosphate, and tris(2-ethylhexyl) phosphate.

The polyhydric alcohol ester includes, for example, diethylene glycol diacetate, diethylene glycol dibenzoate, glycerol monooleate, glycerol tributyrate, glycerol triacetate, glyceryltri(acetyl ricinoleate), and triethylene glycol diacetate.

The epoxy-based plasticizer includes, for example, epoxidized vegetable oil plasticizer, and epoxidized fatty acid alkyl ester. Further, the epoxidized vegetable oil plasticizer includes, for example, epoxidized soybean oil, and epoxidized linseed oil. The epoxidized fatty acid alkyl ester includes, for example, epoxystearic acid methyl ester, epoxystearic acid butyl ester, and epoxystearic acid 2-ethylhexyl ester. Besides, it includes epoxidized polybutadiene, tris(epoxypropyl)isocyanurate, 3-(2-phenoxy)-1,2-epoxypropane, bisphenol A diglycidyl ether, vinyldicyclohexene diepoxide, and a polycondensation product of 2,2-bis(4-hydroxyphenyl)propane and epichlorohydrin The polymer-type plasticizer includes, for example, liquid polyurethane resins, polyester plasticizers obtained from dicarboxylic acid and glylcol; etherfied or esterified products of polyalkylene glycol such as polyethylene glycol and polypropylene glycol; polyether plasticizers such as saccharide-based polyethers which are obtained by addition-polymerizing saccharide-based polyhydric alcohol such as sucrose with alkyleneoxide such as ethyleneoxide and propyleneoxide, followed by etherification or esterification; polystyrene plasticizers such as poly-α-methylstyrene; and poly(meth)acrylate plasticizers free from the hydrolizable silyl group.

Among the above plasticizers, poly(meth)acrylate plasticizers having a weight average molecular weight of 1000 to 7000 and a glass transition temperature of −10° C. or less, are particularly preferable from the viewpoint that durability such as weather resistance of the cured body is maintained. Examples of poly(meth)acrylate plasticizers include "ARUFON UP1000", "ARUFON UP1010", "ARUFON UP1020", "ARUFON UP1060", "ARUFON UP1080", "ARUFON UP1110" "ARUFON UH2000", and "ARUFON UH2130" (all of which are tradenames, and "ARUFON" is a registered trademark of Toagosei Co., Ltd.) manufactured by Toagosei Co., Ltd.

When the curable resin composition according to the present invention contains a plasticizer, the content thereof is preferably 0 to 100 parts by mass, more preferably 0 to 70 parts by mass, and further more preferably 5 to 50 parts by mass, per 100 parts by mass of the polymer (a) having a hydrolyzable silyl group The adhesion promoter includes, for example, mercapto group-containing silanes such as γ-mercaptopropyl trimethoxysilane, γ-mercaptopropyl triethoxysilane, γ-mercaptopropyl methyldimethoxysilane, and γ-mercaptopropyl methyldiethoxysilane; carboxy silanes such as β-carboxyethyl triethoxysilane and β-carboxyethyl phenyl bis(2-methoxyethoxy)silane; vinylically unsaturated group-containing silanes such as vinyltrimethoxysilane, vinyltriethoxysilane, γ-methacryloyloxypropylmethyl dimethoxysilane, and γ-acryloyloxypropylmethyl triethoxysilane; halogen-containing silanes such as γ-chloropropyl trimethoxysilane. These may be used alone or in combination of two or more.

When the curable resin composition according to the present invention contains an adhesion promoter, the content thereof is preferably 0.01 to 20 parts by mass, more preferably 0.1 to 10 parts by mass, per 100 parts by mass of the polymer (a) having a hydrolyzable silyl group.

The dehydrating agent is used for removing moisture so as to maintain storage stability of the curable resin composition during storage, and includes, for example, vinyltrimethoxysilane, vinyltriethoxysilane, methyltrimethoxysilane, phenyltrimethoxysilane, diphenyldimethoxysilane, phenylmethyldimethoxysilane, dimethyldimethoxysilane, phenyltoriethoxysilane, diphenyldiethoxysilane, phenylmethyldiethoxysilane, and dimethyldiethoxysilane. These may be used alone or in combination of two or more.

When the curable resin composition according to the present invention contains a dehydrating agent, the content thereof is preferably 0.01 to 20 parts by mass, more preferably 0.1 to 10 parts by mass, per 100 parts by mass of the polymer (a) having a hydrolyzable silyl group.

The above organic solvent includes, for example, aromatic hydrocarbons such as toluene, acetate esters, and alcohols.

The curable resin composition according to the present invention is stored in a sealed condition after all the ingredients have been blended together, and the seal is removed when it is applied to a substrate. By virtue of such usage, it can serve as one component type curable resin composition.

EXAMPLES

The present invention is explained in further detail by way of Examples below, but the present invention is not particularly limited thereby. In the description below, parts and percentages are based on mass unless otherwise mentioned.

1. Evaluation Method
(1) Curability

A mold having a thickness of 5 mm was filled with a curable resin composition, and then the surface thereof was made smooth. After it was stood still at 23° C. and 60% RH, the time until the composition felt rubbery when pushed by finger was measured as curing time.

(2) Viscosity

Viscosity of curable resin compositions was measured at 25° C. using the E-type viscometer "Model RE550" manufactured by TOKI SANGYO CO., LTD.

(3) Storage Stability

Two grams of a curable resin composition was sealed in an aluminum tube container, and then viscosity was measured in the above-mentioned manner after stood at 50° C. for 7 days. The obtained viscosity was compared with the initial viscosity.

2. Synthesis of Onium Salt

(1) Synthesis Example 1 (methyltri-n-octyl ammonium trifluoromethanesulfonate)

In a 50-ml eggplant shape flask were charged 4.041 g (10.00 mmol) of methyltri-n-octylammonium chloride (reagent), 13.2 g (20 mg chemical equivalent) of anion exchange resin (AMBERLITE IRA900A OH AG (trade name), strong base type, manufactured by Organo Corporation), and 25 ml of toluene, and were stirred for 48 hours under room temperature. After filtering off the ion exchange resin, 1.501 g (10.00 mmol) of trifluoromethane sulfonate was dropped into the resulting product under ice cooling. The ice bath was removed, and additional stirring was continued for 12 hours under room temperature. Then, after rinsing three times with 25 ml of ion-exchange water, the resulting product was dried on anhydrous sodium sulfate and condensed under reduced pressure. The thus-obtained residue was dissolved in 25 ml of methanol to filter off the insoluble matter. The solvent was distilled away under reduced pressure to obtain 5.022 g of pale yellow semisolid (Onium salt A).

(2) Synthesis Example 2

Synthesis was conducted in a similar manner to Example 1, except that 2.302 g (10.00 mmol) of 1-butyl-3-methylpyridinium bromide was used in place of methyltri-n-octylammonium chloride, to obtain 3.184 g of pale yellow liquid (Onium salt B).

(3) Synthesis Example 3 (1-butyl-2,3-dimethylimidazolium hydrogensulfate salt)

In a 50-ml eggplant shape flask were charged 1.887 g (10.00 mmol) of 1-butyl-2,3-dimethylimidazolium chloride, 13.2 g (20 mg chemical equivalent) of anion exchange resin (AMBERLITE IRA900A OH AG, strong base type, manufactured by Organo Corporation), and 25 ml of ion-exchange water, and were stirred for 48 hours under room temperature. After filtering off the ion exchange resin, 2.002 g (10.00 mmol) of a 49% aqueous sulfuric acid solution was dropped into the resulting product under ice cooling. The ice bath was removed, and additional stirring was continued for 12 hours under room temperature. Then, after rinsing with 25 ml of toluene and purifying with ion exchange resin, the resulting product was condensed under reduced pressure. The thus-obtained residue was dissolved in 25 ml of methanol to filter off the insoluble matter. The solvent was distilled away under reduced pressure to obtain 2.203 g of pale yellow oil (Onium salt C).

3. Production of Curable Resin Composition

Example 1

To "Silyl SAT200" (trade name, manufactured by Kaneka Corporation) which is a polymer having a hydrolyzable silyl group, were added 220 ppm of methane sulfonate (reagent manufactured by Kishida Chemical Co., Ltd.) and 2.53 parts by mass of methyltri-n-octyl ammonium trifluoromethanesulfonate (which is an onium salt A synthesized in Synthesis Example 1), and were mixed together under stirring for 10 minutes at room temperature (15 to 30° C.), to produce a curable resin composition. The result is shown in Table 1.

Meanwhile, among the acid catalysts or catalysts shown in Tables 1 and 3, methane sulfonate (pKa: −0.6), trifluoroacetate (pKa: 3.07) and 1,8-diazabicyclo[5,4,0]-7-undecene (base catalyst) were reagents manufactured by Kishida Chemical Co., Ltd., and 10-camphorsulfonate (pKa: 1.2) and dibutyl phosphate (pKa: 1.72) were reagents manufactured by Tokyo Chemical Industry Co., Ltd. Further, onium salts excluding those synthesized above were reagents manufactured by Tokyo Chemical Industry Co., Ltd.

TABLE 1

| Examples | (a) Polymer Type | Content (parts by mass) | (b) Acid catalyst Type | Content (parts by mass) | (c) Onium Salt Type | |
|---|---|---|---|---|---|---|
| 1 | SAT200 | 100 | methane sulfonate | 0.022 | methyltri-n-octylammonium trifluoromethane sulfonate | A |
| 2 | SAT200 | 100 | methane sulfonate | 0.022 | methyltri-n-octylammonium trifluoromethane sulfonate | A |
| 3 | SAT200 | 100 | methane sulfonate | 0.022 | methyltri-n-octylammonium trifluoromethane sulfonate | A |
| 4 | SAT200 | 100 | methane sulfonate | 0.012 | 1-butyl-3-methylpyridinium trifluoromethanesulfonate | B |

TABLE 1-continued

| | | | | | | |
|---|---|---|---|---|---|---|
| 5 | SAT200 | 100 | methane sulfonate | 0.006 | 1-butyl-2,3-dimethylimidazolium hydrogensulfate | C |
| 6 | SAT200 | 100 | methane sulfonate | 0.022 | 1-ethyl-3-methylimidazolium bis(trifluoromethanesulfonyl)imide | Reagent |
| 7 | SAT200 | 100 | methane sulfonate | 0.004 | methyltri-n-octylammonium trifluoromethane sulfonate | A |
| 8 | SAT200 | 100 | methane sulfonate | 0.012 | methyltri-n-octylammonium trifluoromethane sulfonate | A |
| 9 | SAT200 | 100 | 10-camphorsulfonate | 0.08 | methyltri-n-octylammonium trifluoromethane sulfonate | A |
| 10 | SAT200 | 100 | dibutyl phosphate | 0.34 | methyltri-n-octylammonium trifluoromethane sulfonate | A |
| 11 | SAT200 | 100 | dibutyl phosphate | 0.34 | 1-ethyl-3-methylimidazolium bis(trifluoromethanesulfonyl)imide | Reagent |
| 12 | SAT200 | 100 | dibutyl phosphate | 0.34 | 1-ethyl-3-methylimidazolium tetrafluoroborate | Reagent |
| 13 | SAT200 | 100 | trifluoroacetate | 0.08 | methyltri-n-octylammonium trifluoromethane sulfonate | A |
| 14 | SAX220-SC | 100 | methane sulfonate | 0.008 | methyltri-n-octylammonium trifluoromethane sulfonate | A |
| 15 | MA440 | 30 | methane sulfonate | 0.008 | methyltri-n-octylammonium trifluoromethane sulfonate | A |
| | SAT200 | 70 | | | | |

| | (c) Onium Salt | | Viscosity (mPa·s) | |
|---|---|---|---|---|
| Examples | Content (parts by mass) | Curing time | Initial | 7 days later at 50° C. |
| 1 | 2.53 | 1 hour | 37,900 | 39,400 |
| 2 | 5.06 | 1 hour | 30,800 | 31,500 |
| 3 | 7.59 | 1 hour | 17,200 | 18,700 |
| 4 | 1.51 | 1 hour | 22,100 | 26,900 |
| 5 | 0.07 | 3 hours | 23,300 | 27,800 |
| 6 | 3.87 | 1 hour | 12,500 | 13,000 |
| 7 | 0.06 | 6 hours | 19,800 | 20,600 |
| 8 | 0.42 | 1 hour | 27,500 | 28,800 |
| 9 | 2.53 | 12 hours | 17,300 | 17,600 |
| 10 | 0.42 | 6 hours | 42,100 | 53,600 |
| 11 | 0.65 | 6 hours | 43,600 | 51,400 |
| 12 | 0.32 | 6 hours | 45,500 | 59,300 |
| 13 | 2.53 | 24 hours | 16,800 | 18,200 |
| 14 | 2.53 | 1 hour | 60,300 | 65,400 |
| 15 | 2.53 | 1 hour | 57,400 | 67,600 |

Examples 2-15 and Comparative Examples 1-7

A curable resin composition was produced in the same manner as in Example 1, except that the polymer having a hydrolyzable silyl group (Silyl series manufactured by Kaneka Corporation, in Table 2), the acid catalyst and the onium salt blended in the curable resin composition were changed to those shown in Tables 1 and 3. The results are shown in Tables 1 and 3.

TABLE 2

| Silyl series | Main chain chemical structure | Number Average Molecular weight |
|---|---|---|
| SAT200 | polypropylene glycol | 12700 |
| SAX200-SC | polypropylene glycol | 25900 |
| MA440 | Acrylic | 10100 |

TABLE 3

| | Polymer | | Catalyst A | | | |
|---|---|---|---|---|---|---|
| Comparative Examples | Type | Content (parts by mass) | Type | Content (parts by mass) | Catalyst B | Type |
| 1 | SAT200 | 100 | methane sulfonate | 0.022 | methyltri-n-octyl-ammonium chloride | Reagent from Aldrich |
| 2 | SAT200 | 100 | methane sulfonate | 0.022 | ammonium chloride | Reagent from Kishida Chemical Co., Ltd. |
| 3 | SAT200 | 100 | methane sulfonate | 0.022 | ammonium carbonate | Reagent from Kishida Chemical Co., Ltd. |

TABLE 3-continued

| | | | | | | |
|---|---|---|---|---|---|---|
| 4 | SAT200 | 100 | methane sulfonate | 0.022 | N,N-dimethyldodecyl-amine | Reagent from Tokyo Chemical Industry Co., Ltd. |
| 5 | SAT200 | 100 | 1,8-diazabicyclo[5.4.0]-7-undecene | 0.034 | methyltri-n-octyl-ammonium trifluoromethane sulfonate | A |
| 6 | SAT200 | 100 | methane sulfonate | 0.022 | — | — |
| 7 | SAT200 | 100 | dibutyl phosphate | 0.34 | — | — |

| | Catalyst B | | Viscosity (mPa · s) | |
|---|---|---|---|---|
| Comparative Examples | Content (parts by mass) | Curing time | Initial | 7 days later at 50° C. |
| 1 | 3.96 | 4 days | 33,500 | gelated |
| 2 | 0.62 | 3 hours | 25,800 | 641,000 |
| 3 | 0.82 | 3 hours | 23,900 | 126,000 |
| 4 | 0.05 | over 7 days | 21,600 | 42,300 |
| 5 | 5.07 | over 7 days | 22,900 | gelated |
| 6 | — | 1 hour | 96,800 | 361,000 |
| 7 | — | 24 hours | 39,900 | 98,500 |

INDUSTRIAL APPLICABILITY

The curable resin composition according to the present invention is suitably used as elactic adhesives or sealants for applications in automobile, electrical and building material fields and other applications requiring durability such as heat resistance, cold resitance, weather resistance and impact resistance indoor and outdoor.

The invention claimed is:

1. A curable resin composition which comprises (a) a polymer having a hydrolyzable silyl group, (b) an acid catalyst having a pKa of 4 or lower at 25° C., and (c) an onium salt represented by the following general formula (1):

   C$^+$A$^-$   (1)

wherein C$^+$ is an onium cation, and A$^-$ is a hydrogen sulfate anion, a hydrogen sulfite anion, a sulfonate anion represented by R$^1$SO$_3^-$ wherein R$^1$ represents an alkyl group, perfluoroalkyl group, cycloalkyl group, vinyl group, aryl group, perfluoroaryl group, aralkyl group or halogen atom; or a bis(substituted sulfonyl) imide anion represented by (R$^2$SO$_2$)$_2$N$^-$ wherein R$^2$ represents an alkyl group, perfluoroalkyl group, or aryl group; tetrafluoroborate anion, or hexafluorophosphate anion,
wherein the main chain chemical structure of the polymer (a) having a hydrolyzable silyl group is at least one polymer selected from the group consisting of oxyalkylene polymer, vinyl polymer, polyester polymer, polyurethane polymer and polycarbonate polymer,
said curable resin composition containing the acid catalyst (b) in an amount of from 0.002 to 2 parts by mass, relative to 100 parts by mass of the polymer (a) having a hydrolyzable silyl group,
said curable resin composition containing the onium salt (c) in an amount of from 0.005 to 10 parts by mass, relative to 100 parts by mass of the polymer (a) having a hydrolyzable silyl group, and
wherein the cation of the onium salt (c) is at least one onium cation selected from the group consisting of quaternary ammonium cation, imidazolium cation, and pyridinium cation.

2. The curable resin composition according to claim 1, wherein the polymer (a) having a hydrolyzable silyl group has a number average molecular weight of from 500 to 50,000.

3. The curable resin composition according to claim 1, wherein the anion of the onium salt (c) is at least one anion selected from the group consisting of hydrogen sulfate anion, perfluoroalkylsulfonate anion, and bis(perfluoroalkane sulfonyl)imide anion.

4. A curable resin composition which comprises (a) a polymer having a hydrolyzable silyl group, (b) an acid catalyst having a pKa of 4 or lower at 25° C., and (c) an onium salt represented by the following general formula (1):

   C$^+$A$^-$   (1)

wherein C$^+$ is an onium cation, and A$^-$ is a hydrogen sulfate anion, a hydrogen sulfite anion, a sulfonate anion represented by R$^1$SO$_3^-$ wherein R$^1$ represents an alkyl group, perfluoroalkyl group, cycloalkyl group, vinyl group, aryl group, perfluoroaryl group, aralkyl group or halogen atom; or a bis(substituted sulfonyl) imide anion represented by (R$^2$SO$_2$)$_2$N$^-$ wherein R$^2$ represents an alkyl group, perfluoroalkyl group, or aryl group; tetrafluoroborate anion, or hexafluorophosphate anion,
wherein the main chain chemical structure of the polymer (a) having a hydrolysable silyl group is at least one polymer selected from the group consisting of oxyalkylene polymer, vinyl polymer, polyester polymer, polyurethane polymer and polycarbonate polymer,
said curable resin composition containing the acid catalyst (b) in an amount of from 0.002 to 2 parts by mass, relative to 100 parts by mass of the polymer (a) having a hydrolyzable silyl group,
said curable resin composition containing the onium salt (c) in an amount of from 0.005 to 10 parts by mass, relative to 100 parts by mass of the polymer (a) having a hydrolyzable silyl group, and
wherein the onium cation of the onium salt (c) comprises a quaternary ammonium cation.

5. A curable resin composition which comprises (a) a polymer having a hydrolyzable silyl group, (b) an acid catalyst having a pKa of 4 or lower at 25° C., and (c) an onium salt represented by the following general formula (1):

wherein $C^+$ is an onium cation, and $A^-$ is a hydrogen sulfate anion, a hydrogen sulfite anion, a sulfonate anion represented by $R^1SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl) imide anion represented by $(R^2SO_2)_2N^-$ wherein $R^2$ represents an alkyl group, perfluoroalkyl group, or aryl group; tetrafluoroborate anion, or hexafluorophosphate anion, wherein the main chain chemical structure of the polymer (a) having a hydrolysable silyl group is at least one polymer selected from the group consisting of oxyalkylene polymer, vinyl polymer, polyester polymer, polyurethane polymer and polycarbonate polymer, said curable resin composition containing the acid catalyst (b) in an amount of from 0.002 to 2 parts by mass, relative to 100 parts by mass of the polymer (a) having a hydrolyzable silyl group, said curable resin composition containing the onium salt (c) in an amount of from 0.005 to 10 parts by mass, relative to 100 parts by mass of the polymer (a) having a hydrolyzable silyl group, and wherein the onium cation of the onium salt (c) comprises an imidazolium cation.

6. A curable resin composition which comprises (a) a polymer having a hydrolyzable silyl group, (b) an acid catalyst having a pKa of 4 or lower at 25° C., and (c) an onium salt represented by the following general formula (1):

wherein $C^+$ is an onium cation, and $A^-$ is a hydrogen sulfate anion, a hydrogen sulfite anion, a sulfonate anion represented by $R^1SO_3^-$ wherein $R^1$ represents an alkyl group, perfluoroalkyl group, cycloalkyl group, vinyl group, aryl group, perfluoroaryl group, aralkyl group or halogen atom; or a bis(substituted sulfonyl) imide anion represented by $(R^2SO_2)_2N^-$ wherein $R^2$ represents an alkyl group, perfluoroalkyl group, or aryl group; tetrafluoroborate anion, or hexafluorophosphate anion, wherein the main chain chemical structure of the polymer (a) having a hydrolysable silyl group is at least one polymer selected from the group consisting of oxyalkylene polymer, vinyl polymer, polyester polymer, polyurethane polymer and polycarbonate polymer, said curable resin composition containing the acid catalyst (b) in an amount of from 0.002 to 2 parts by mass, relative to 100 parts by mass of the polymer (a) having a hydrolyzable silyl group, said curable resin composition containing the onium salt (c) in an amount of from 0.005 to 10 parts by mass, relative to 100 parts by mass of the polymer (a) having a hydrolyzable silyl group, and wherein the onium cation of the onium salt (c) comprises a pyridinium cation.

7. The curable resin composition according to claim 2, wherein the acid catalyst (b) is at least one acid selected from the group consisting of sulfonic acid, hydrochloric acid, nitric acid, phosphoric acid, phosphoric acid monoester, phosphoric acid diester, phosphorous acid, phosphorous acid ester, hypophosphorous acid, halogenated alkylcarboxylic acid, and halogenated arylcarboxylic acid.

8. A cured product obtained by curing a curable composition according to claim 1.

* * * * *